US 6,996,106 B2

United States Patent
Payne et al.

(10) Patent No.: US 6,996,106 B2
(45) Date of Patent: Feb. 7, 2006

(54) HIGH-SPEED INTERCHIP INTERFACE PROTOCOL

(75) Inventors: Robert L. Payne, San Jose, CA (US); David R. Evoy, Chandler, AZ (US); Timothy Pontius, Lake in the Hills, IL (US); George Ellis Spatz, Lake Zurich, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 967 days.

(21) Appl. No.: 09/997,609

(22) Filed: Nov. 29, 2001

(65) Prior Publication Data

US 2003/0099238 A1    May 29, 2003

(51) Int. Cl.
  *H04L 12/28*   (2006.01)
(52) U.S. Cl. .................. 370/394; 710/11; 710/104
(58) Field of Classification Search ........... 370/394, 370/395.4; 710/11, 58–59, 61, 105–106
  See application file for complete search history.

(56) References Cited

U.S. PATENT DOCUMENTS 6,009,488 A * 12/1999 Kavipurapu ............ 710/105
6,263,385 B1 * 7/2001 Gulick et al. ............ 710/313
6,611,891 B1 * 8/2003 Hewitt et al. ............ 710/306
6,748,442 B1 * 6/2004 Keller ...................... 709/232
2003/0051058 A1 * 3/2003 Phong et al. ............ 709/250

OTHER PUBLICATIONS

IBM Technical Disclosure Bulletin, Dec. 1991, US; NA9112355.*

* cited by examiner

Primary Examiner—Ricky Ngo
Assistant Examiner—Richard Chang
(74) Attorney, Agent, or Firm—Peter Zawilski (57) ABSTRACT

A communication protocol provides high-speed transfers of parallel data between an origination end and a destination end. The protocol involves regularly transmitting data from the origination end to the destination end, including transmitting idle data from the origination end when the destination end is busy and during periods when no commands, data or statuses are pending. When the destination end is not busy, data is sent from the origination end to the destination end by: sequentially transferring read or write commands and, according to a write protocol, pending write data; and transmitting idle packets during periods when no commands are pending. When the origination end is not busy, data is sent from the destination end to the origination end by: sequentially transferring pending end-of-write statuses; sequentially transferring pending read data and read statuses packets according to a read protocol during periods when no end-of-write statuses are pending; and transmitting idle packets during periods when no read data or read status are pending.

15 Claims, 7 Drawing Sheets

HIGH-SPEED INTERCHIP INTERFACE PROTOCOL

CROSS REFERENCE TO RELATED APPLICATIONS

This application is related to co-pending U.S. patent application Ser. No. 09/871,197 (VLSI.295PA), entitled "Parallel Communication Based on Balanced Data-Bit Encoding," filed on May 31, 2001; U.S. patent application Ser. No. 09/871,160 (VLSI.299PA), entitled "Parallel Data Communication Consuming Low Power," filed on May 31, 2001; U.S. patent application Ser. No. 09/871,159 (VLSI.300PA), entitled "Parallel Data Communication Having Skew Intolerant Data Groups," filed on May 31, 2001; and U.S. patent application Ser. No. 09/871,117 (VLSI.312PA), entitled "Parallel Data Communication Having Multiple Sync Codes," filed on May 31, 2001. The above-mentioned related applications are fully incorporated herein by reference.

FIELD OF THE INVENTION

The present device relates generally to data communications and, more particularly, to methods and arrangements for communicating data across a high-speed interface between integrated circuit chips.

BACKGROUND OF THE INVENTION

Ongoing demands for more-complex circuits have led to significant achievements that have been realized through the fabrication of very large-scale integration of circuits on small areas of silicon wafer. These complex circuits are often designed as functionally-defined blocks, or physically-defined chips, that operate on a sequence of data and then pass that data on for further processing. This communication from such physically-defined chips can be passed in small or large amounts of data between individual discrete circuits, between integrated circuits ("ICs"), within the same chip, between ICs located on different chips, and between more remotely-located communication circuit arrangements and systems. Regardless of the configuration, the communication typically requires closely-controlled interfaces to insure that data integrity is maintained and that chip-set designs are sensitive to practicable limitations in terms of implementation space and available operating power.

With the increased complexity of circuits, there has been a commensurate demand for increasing the speed at which data is passed between the circuit blocks, and between IC chips. Many of these high-speed communication applications can be implemented using parallel data interconnect transmission in which multiple data bits are simultaneously sent across parallel communication paths. Such "parallel bussing" is a well-accepted approach for achieving data transfers at high data rates.

A typical system might include a number of modules (e.g., one or more cooperatively-functioning chips) that interface to and communicate over a parallel data communication line, for example, a processor chip communicating with a peripheral via a cable, a backplane circuit, an internal bus structure on a chip, an interchip interface, other interconnect, or any combination of such communication media. A sending module transmits data over a bus synchronously with a clock on the sending module. In this manner, the transitions over the parallel signal lines leave the circuits of the sending module in a synchronous relationship with each other and/or to the clock on the sending module. At the other end of the parallel data interconnect, the data is received along with a clock signal; the receive clock is typically derived from or is synchronous with the clock on the sending module. The rate at which the data is passed over the parallel signal lines is sometimes referred to as the (parallel) "bus rate."

Implementing electronic devices using a plurality of circuit modules, including discrete IC chips, is desirable for a variety of reasons. Accordingly, improving the hardware and associated transmission protocols used to effect data communication over parallel busses permit more practicable and higher-speed parallel bussing applications which, in turn, can directly lead to serving the demands for high-speed circuits while maintaining data integrity. Various aspects of the present invention address the above-mentioned deficiencies and also provide for communication methods and arrangements that are useful for other applications as well.

SUMMARY OF THE INVENTION

The present invention is directed to a method and circuit for transferring data between two modules (functional blocks) intercoupled by a parallel data communication path. The present invention is exemplified in a number of implementations and applications, some of which are summarized below.

According to an example embodiment of the present invention, a high-speed communication is provided over a parallel communication channel between an origination end and a destination end. The protocol involves regularly transmitting data from the origination end to the destination end, including transmitting idle data from the origination end when the destination end is busy and during periods when no commands, or data or statuses are pending. When the destination end is not busy, data is sent from the origination end to the destination end by: sequentially transferring read or write_commands and, according to a write protocol, pending write data; and otherwise transmitting idle packets. When the origination end is not busy, data is sent from the destination end to the origination end by: sequentially transferring pending end-of-write statuses; sequentially transferring pending read data and read statuses according to a read protocol during periods when no end-of-write statuses are pending.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to methods and arrangements for transferring data between two modules (functional blocks) intercoupled by a parallel data communication path. The invention has been found to be particularly advantageous for use in connection with high-speed data transfer applications requiring or benefiting from preservation of data integrity. Examples of such applications include, among others, SSTL (stub series transceiver logic), RSL (Rambus Signaling Logic) interfaces, closely-connected applications such as where the parallel data communication path intercouples the two modules on a single-chip, off-board high-speed communication between chips immediately adjacent to each other on the same printed circuit board. Other example applications are described in connection with the high-speed parallel data communications implementations disclosed in the above referenced patent documents. While the present invention is not necessarily limited to such devices, an appreciation of various aspects of the invention is best gained through a discussion of various examples using this application.

Figure 1:
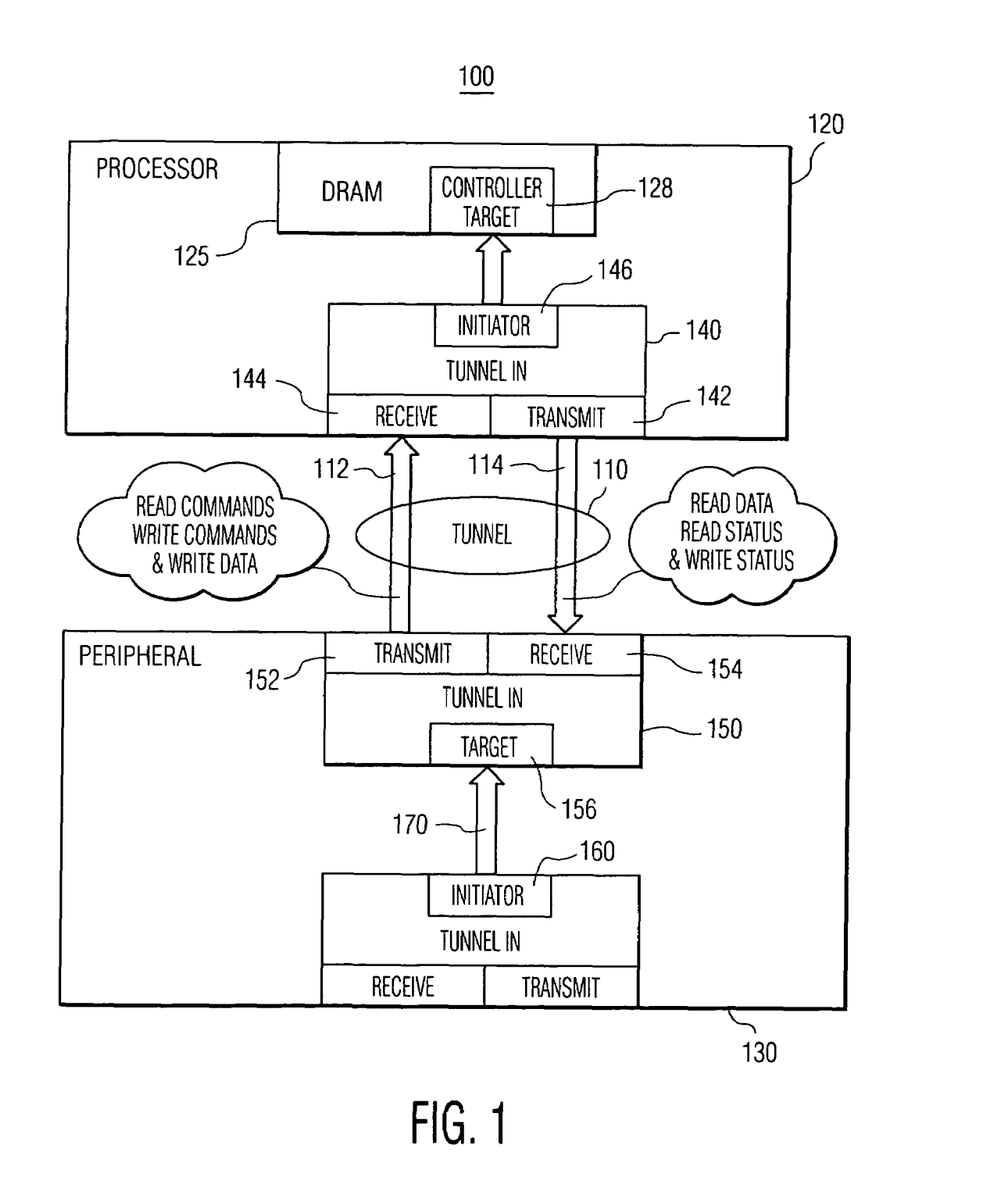
FIG. 1 is a block diagram illustrating a high-speed interchip data communication interface having a communication protocol according to an example embodiment of the present invention.

FIG. 1 illustrates one example embodiment of a parallel data communication arrangement 1100, according to the present invention. The arrangement 100 includes a processor IC chip 120 and a peripheral IC chip 130 coupled through a high-speed interchip data communication channel, for example, a tunnel interface 110. Processor 120 includes a DRAM circuit 125. Tunnel 110 functions as an intermediate target 156 and intermediate initiator 146, allowing an initiator 160 to communicate with a target, for example, communicate upward to a main system memory located on a remote chip 125. Tunnel 110 includes electrical data paths and is adapted to implement data transfers according to various timing, encoding, and protocol methods. The tunnel supports high bandwidth streaming data, and is configured as a point-to-point connection. Interconnecting more than two devices mandates daisy-chaining tunnel connections, requiring more than one tunnel interface per device.

Tunnel 110 in the peripheral chip 130 is coupled as a target 156 for other internal devices via the internal bus 170, allowing the tunnel to act as an intermediate initiator across the tunnel for the peripheral chip 130. The tunnel is configured to perform an intermediate initiator 146 function internal to the processor chip 120, with the DRAM 125, and more particularly the DRAM controller 128, as the tunnel's target. The tunnel is adapted to operate transparently to the initiator 160 in the peripheral chip 130, appearing to the peripheral initiator 160 as if it is connected via the local bus 170 to the target interface in the DRAM controller 128. A multiplexer (not shown) and arbiter (not shown) are used where necessary for initiator selection where the tunnel is a target among a plurality of initiators. Various data encode/decode processing circuits are optionally interfaced to, or integrated with, the tunnel configuration.

Tunnel 110 has a tunnel-in end 140 at processor chip 120, and a tunnel-out end 150 at peripheral 130. Tunnel-in end 140 includes a transmit side 142 and a receive side 144. Tunnel-out end 150 includes a transmit side 152 and a receive side 154. The tunnel-out end 150 at the peripheral chip 130 is used to transfer data from streaming data masters (not shown) in the peripheral chip, coupled to bus 170, to the unified DRAM 125 that connects to the processor core. Additional initiators may be coupled to the tunnel via bus 170. In an alternative implementation, a tunnel is used to support many additional high-speed bandwidth requirements, for example, two separate processor chips sharing a single DRAM controller. The tunnel transports requests for reading and writing data, from a target 156 in the tunnel-out end 150, to an intermediate initiator 146 in the tunnel-in end 140.

Tunnel 110 includes two completely independent channels, a first channel 112, and a second channel 114. Each channel operates to transmit in a single direction, as indicated by the arrows depicting each respective channel in FIG. 1. Each channel constantly transmits packetized "information" in the direction shown, although at times the "information" is idle packets. The respective channels do not transmit information in a direction reverse to that shown. Therefore, establishing priority for a channel between the channel's two ends is not necessary (e.g., the transmit end always has "priority").

In one example implementation, tunnel 110 is adapted to transmit data in 32-bit values (a "32-bit tunnel"). In another example implementation, tunnel 110 includes an extension and is adapted to transmit 64-bit values (a "64-bit tunnel) for bandwidth-critical applications. Typically, data is packetized for transmission across tunnel 110. According to a more particular implementation, tunnel 110 is adapted to transmit a 32-bit data payload packetized into a 36-bit data packet, the 36-bit packet thereby being distinguishable from a qualifier packet, for example. Qualifier packets are explained further below. Tunnel 110 is arranged to transmit the 36-bit data packet, after the packet is encoded, using 48 actual data lines. Tunnel 110 is adapted to utilize a communication protocol for controlling data flow on the parallel communication channel between the processor and the peripheral. The tunnel protocol includes a write protocol and a read protocol.

Figure 2A:
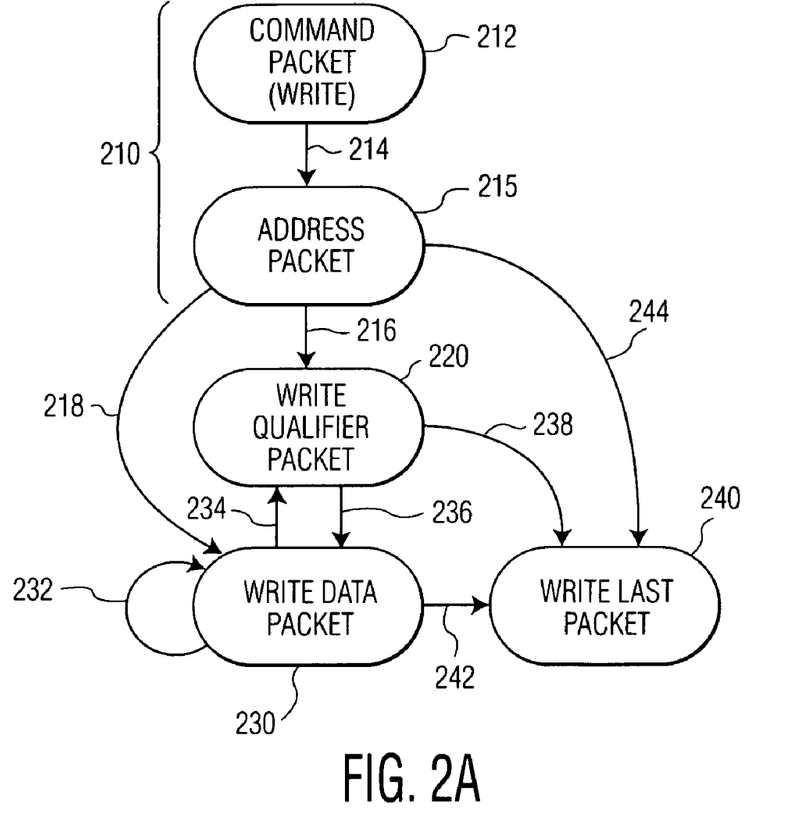
FIG. 2 is a state diagram illustrating a write protocol, according to an example embodiment of the present invention.
Figure 2B:
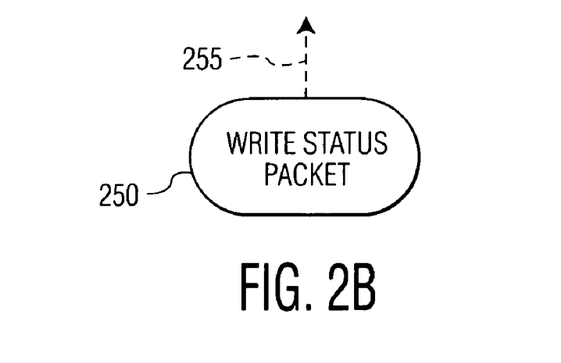

FIGS. 2A and 2B are state diagrams illustrating a write protocol, according to one aspect of the present invention. The states of the state diagrams of this Application are referenced herein by the type of information communicated at that particular state according to the protocol of the present invention. Write transactions are used to transmit data from an initiator to a target. Byte lanes to write are identified by the last portion of a write command, or an optional write qualifier packet sent.

Referring now to FIG. 2A, a write transaction always begins with a command packet 210 being transmitted across the tunnel. For a 32-bit tunnel, write command information is packaged into a write command packet 212, and address information is packaged into a separate address packet 215. The address packet is communicated after the write command packet as indicated by state arrow 214. A 64-bit tunnel sends write command and address information together as a single packet 210.

Communication of the command and address packet(s) are optionally followed by a write qualifier packet 220 as indicated by state arrow 216. The write qualifier packet includes optional write command information and is used in exceptional cases where the fields of the write command packet do not communicate all of the options necessary. If additional write command information is not required, for example, where control of byte enables is not required, the write qualifier packet is preferably not sent. Use of a write qualifier packet with each write data transfer is neither efficient, nor necessary.

For a typical multi-data-element write, a write data packet 230 is communicated after address information as indicated by state arrow 218. As a general scenario where write command information remains constant throughout the data transfer (e.g., same mask), a burst of write data packets 230 are communicated sequentially across the tunnel as indicated by state arrow 232 until one packet of write data remains. The last packet of write data is communicated as a write last packet 240. The write last packet is sent once for each write transaction as the last data transfer. The write last packet, the last element of write data, notifies receive side 144 of the tunnel end that the write transaction is complete, that the write can be posted to the DRAM, and that a write status is eventually expected in return. Signaling the last write data element eliminates the need for receive side 144 to count the write data elements transferred during a given transaction.

Byte enables may be used to selectively write bytes. Byte enables are a "sticky" field, in other words, byte enables remain in effect until subsequently modified. Generally, byte enables are asserted for the first write data packet in the write command packet, and where necessary, in the optional write qualifier packet. When a burst write, to memory for example, is performed that always writes to the same bytes, then the byte enables set in the write command remain effective, and all subsequent data is written using the initial byte enables. Byte enables remain in effect until a new write command and/or a write qualifier packet is transmitted. Where further manipulations of byte enables are desired for subsequent data packets, a write qualifier packet is communicated preceding the intended write data packet. The write qualifier packet 220 is inserted between write data packets 230, following a write data packet not intended to be subject to the modified byte enables as indicated by state arrow 234, and preceding a non-last write data packet intended to be the initial write data packet subjected to the modified byte enables, as indicted by state arrow 236. State arrow 238 indicates that a write qualifier packet can also be communicated to assert write enables preceding a write last (data) packet 240. State arrow 242 indicates that if the last data packet 240 does not require modification of byte enables, and thus a preceding write qualifier packet, the write last packet 240 is sent following transmission of the last write data packet 230.

As an example use of byte enables, consider a lengthy burst write transaction that begins and ends on an address that is not aligned to the width of the tunnel data transfers, 32 bits in one typical implementation. Three write masks are required, one included within the write command, and two delivered via write qualifier packets. The packet sequence is as follows:

(1) Write command (and address) packet including byte enables asserted for the first write data packet;
(2) First write data packet;
(3) Write qualifier packet with all mask bits enabled;
(4) Burst of write data packets;
(5) Write qualifier packet with mask bits set for the last data transfer; and
(6) Write last packet.

As a general case, a write qualifier packet 230 does not immediately follow a write command packet (only where additional write command information not included in the write command packet is required.) Two-dimensional ("2D") transfers are an exception to the general case. For certain transfers, such as a 2D transfer, a write qualifier packet immediately follows a write command packet (e.g., for a 64-bit tunnel; for a 32-bit tunnel, the write qualifier packet 220 immediately follows the address packet 215). State arrow 216 in FIG. 2A further indicates the above-mentioned state path for a 2D write.

A 2D transfer is a transfer that moves a "two-dimensional" block of data with one command. Consider a block of data, for example a 1000 pixel wide by 1000 pixel tall digital image. One method of storing the image in memory is to store the top row of pixel data in a first 1000 memory locations, address locations 0–999 for example. The next row of pixel data is stored in the next 1000 memory location (e.g., 1000–1999), and so on. The two-dimensional image is stored in a block of memory locations. Certain compression algorithms (e.g., MPEG, JPEG, etc.) operate on smaller two-dimensional portions of the image, for example an 8 pixel by 8 pixel area. One of these image portions can be retrieved from memory using eight commands, each command retrieving a row of eight pixels. Alternatively, a 2D command is used to request all 64 pixels at once. Typically, a 2D command specifies a number of elements (i.e., pixels) per line, a number of lines and a difference in memory addresses between each line, or stride, 1000 in this example. According to one aspect of the present invention, the line count and stride are transmitted in the write (or read) qualifier packet immediately following the write command packet for 2D transfers.

For a typical, single-data-element write, the write data is communicated via a write last packet 240, communicated immediately after address information as indicated by state arrow 244.

Figure 3A:
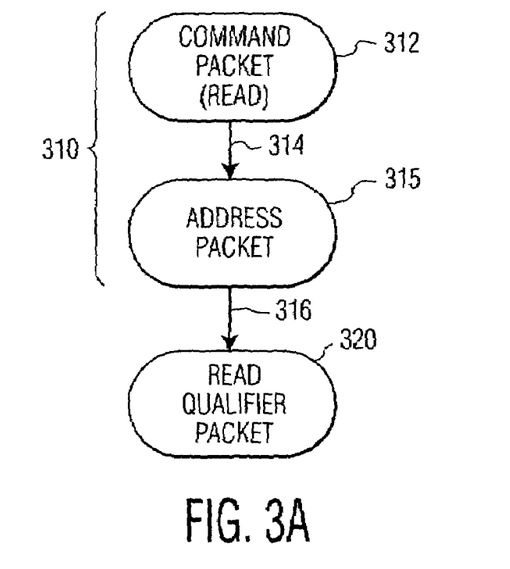
FIG. 3 is a state diagram illustrating a read protocol, according to an example embodiment of the present invention.
Figure 3B:
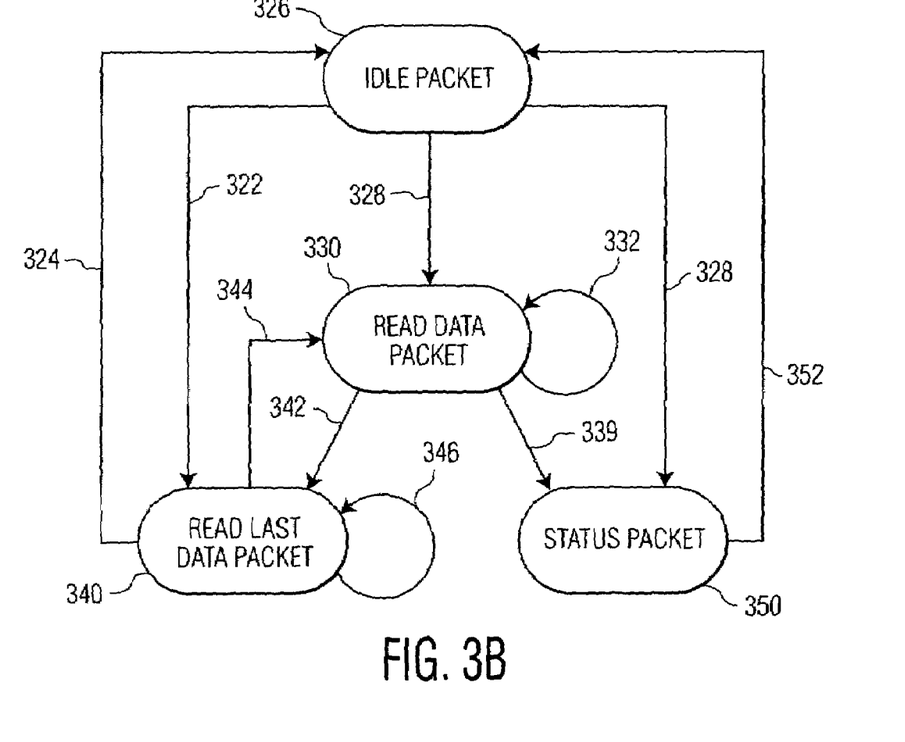

A write status packet 250 is returned from a receiving side to a transmitting side of the tunnel to complete a write transaction, as illustrated in FIG. 2B. Additional write sequences, and read commands are allowed to be transmitted from the transmitting side of the tunnel anytime following communication of the write last packet. Waiting for return of the write status packet is not necessary. If the initiator retires the write command, as is often done for posted writes, the write status packet may not be useful; however, the write status packet is required to be returned even if it is ignored upon receipt. One or more idle packets may be inserted between any of the states illustrated in FIG. 2A as required for proper flow control and buffer management. FIGS. 3A and 3B are state diagrams illustrating a read protocol, according to one aspect of the present invention. Read transactions are used to transmit data from a target to an initiator. Byte lanes to read are identified by the last read command or optional read qualifier packet sent. As shown in FIG. 3A, a read transaction always begins with a read command packet 310 being transmitted across the tunnel from the tunnel-out end to the tunnel-in end. The command packet includes information that a read flag is asserted (e.g., equals "1"). For a 64-bit tunnel, the read command packet 310 communicates the address and the length of the transfer for the read command. For a 32-bit tunnel, the read command and address portions are packaged separately and sent via a 32-bit read command packet 312, and an address packet 315 respectively. The (read) address packet is communicated after the read command packet as indicated by state arrow 314.

An extended read command includes information communicated by a read qualifier packet 320, transmitted after a read command packet. A complete read command (e.g., 310) is communicated and signaled by the read command packet by setting an EXT flag is set to a "0," or alternatively by setting the EXT flag to a "1," which signals that an extended read command, and a read qualifier field is being communicated by the next read qualifier packet sent. Information necessitating a read qualifier packet is primarily used in conjunction with special reads, for example a 2D read operation. Only one read qualifier packet is sent, when needed, per read transaction. No mechanism exists to vary the byte enables per read (data packet) transfer, as is the case for write (data packet) transfers.

Read commands are transmitted from the tunnel-out end to the tunnel-in end. Sometime after transmission of the read command (and optional read qualifier packet) to a target, data is returned from the target in the reverse direction from the read command direction (e.g., from the tunnel-in end back to the tunnel-out end). Read data return is disconnected in time from transmission of read commands. Idle packets may be transmitted while awaiting the initiation of the actual transfer of read data.

FIG. 3B illustrates the return of read data from the tunnel-in end back to the tunnel-out end. According to one aspect of the present invention, one or more idle packets 326 may be inserted (i.e., sent) between any of the read protocol states, for example following transmission of either the read command packet 310 or the read qualifier packet 320 respectively, since read data return is disconnected in time from read commands. Read data is packaged into a variable quantity of read data packets 330, always concluding with either a read last data packet 340 or a status packet 350 at the end of the transaction. Once read data is ready for transmission, the idle state is followed by transmission of a read data packet 330 as indicated by state arrow 328. Additional read data packets are transmitted sequentially as indicate by state arrow 332, as necessary for a particular read. A normal, non-extended read transaction without error ends with a read last packet 340 as indicated by state arrow 342. Read transactions including special completion codes, for example read errors, end with a status packet 350 as indicated by state arrow 339.

When a read transaction includes only a single read data transfer, and does not include a special completion code requiring transaction termination via a status packet 350, a read last data packet 340 is the only substantive transfer for the entire transaction, as is indicated by state arrow 322. State arrow 324 in FIG. 3B indicates the communication process returning to the idle state from a read last packet transfer 340. State arrows 344 and 346 indicate subsequent read data transfers, bypassing the idle state 326. According to a first instance, a new (multi-packet) read follows the read last data packet transfer 340, and is initiated by a read data packet 330. This transition between reads is indicated by state arrow 344. Alternatively, a subsequent read includes only a single read data transfer without a special completion code, and another read last data packet 340 is again sent as the only substantive transfer for the subsequent read transaction. Sequential read last data packet transfers are indicated by state arrow 346. When a read transaction includes only a single read data transfer, but does include a special completion code and thus a status packet 350, the status packet 350 is the only substantive transfer for the entire transaction, as is indicated by state arrow 328. State arrow 352 in FIG. 3B indicates the communication process returning to the idle state from a read status packet transfer.

Figure 4:
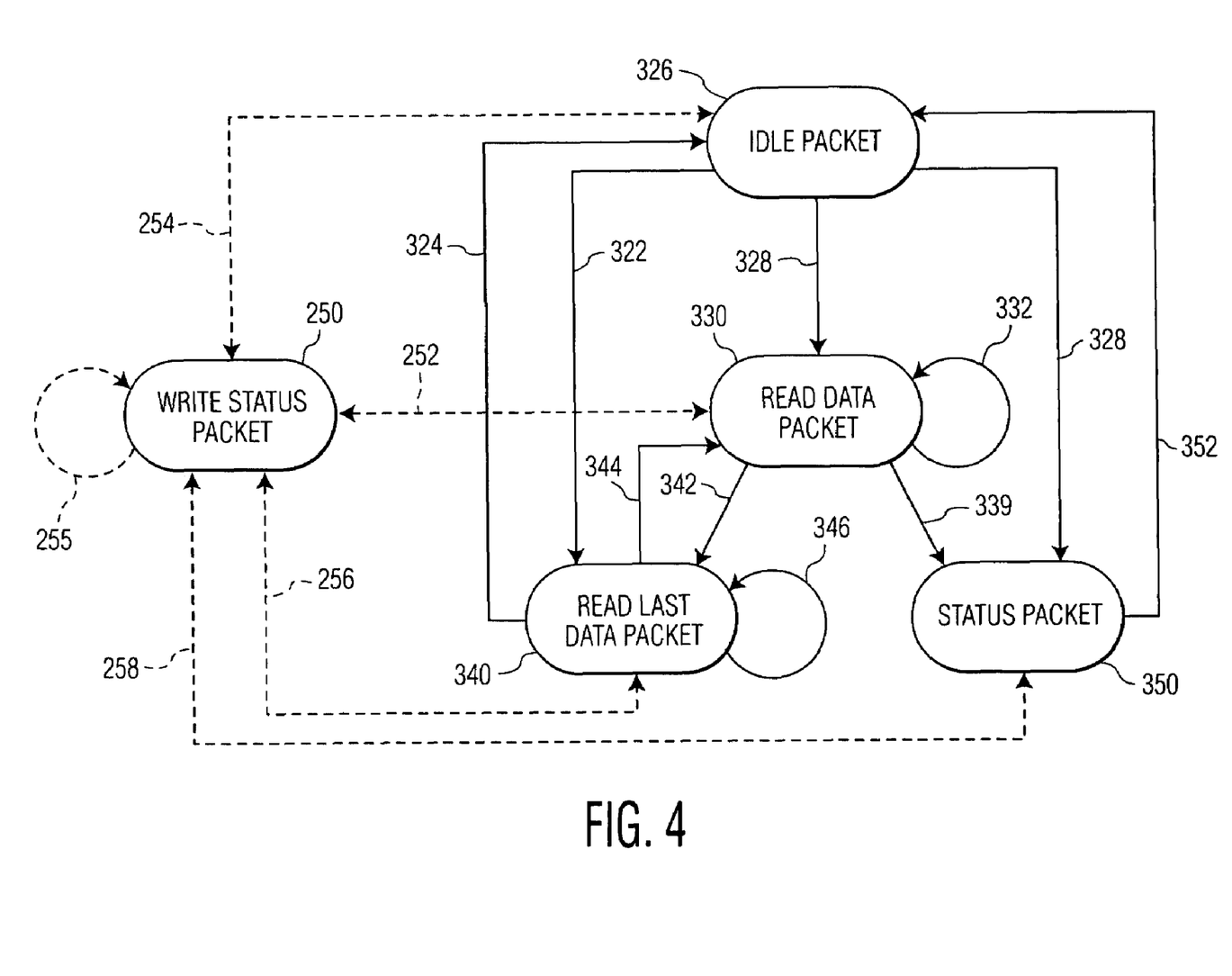
FIG. 4 is a state diagram illustrating a tunnel-out receive/tunnel-in transmit protocol, according to an example embodiment of the present invention.

FIG. 4 is a state diagram illustrating the state transitions of a tunnel protocol for a tunnel-out receive/tunnel-in transmit transaction, according to one aspect of the present invention. The tunnel protocol combines the read and write protocols for integrated read and write tunnel traffic operations. Referring to FIGS. 1 and 4, the primary function of the tunnel-in transmit side 142 is to transfer read data. In addition, the transmit side of the tunnel-in end returns a write status packet for each write transaction. Write status packets are transmitted at a higher priority than read data packets, and can be inserted between any two states of the read portion of the tunnel protocol. This ability is indicated in FIG. 4 by double-ended dotted state arrows 252, 254, 256, and 258, which provide a bypass path to any solid state arrow through transmission of a write status packet 250. Additionally, dotted state arrow 255 indicates that multiple write status packets 250 may be transmitted consecutively.

According to one aspect of the tunnel protocol of the present invention, idle packets 326 may be inserted at any place in the state diagram of FIG. 4 as require for flow control. However, every configuration of an idle packet transmission state is not shown in the diagram of FIG. 4 for simplification.

Coordination of read and write transmissions across channel 114 of the tunnel, according to an example implementation of a combined tunnel protocol, is accomplished through an established priority listed as follows from highest priority to lowest:

(1) Transmit idle packet(s) when the tunnel-out end, receive side is busy;

(2) Transmit pending write status packet(s);

(3) Transmit pending read data, read last data, and (read) status packets according to the read protocol; and (4) Transmit idle packets.

The tunnel-out end, receive side is indicated as being busy by a "T_RDS_BUSY" (Tunnel Read-Data/Status busy) signal being asserted to a "1."

Figure 5:
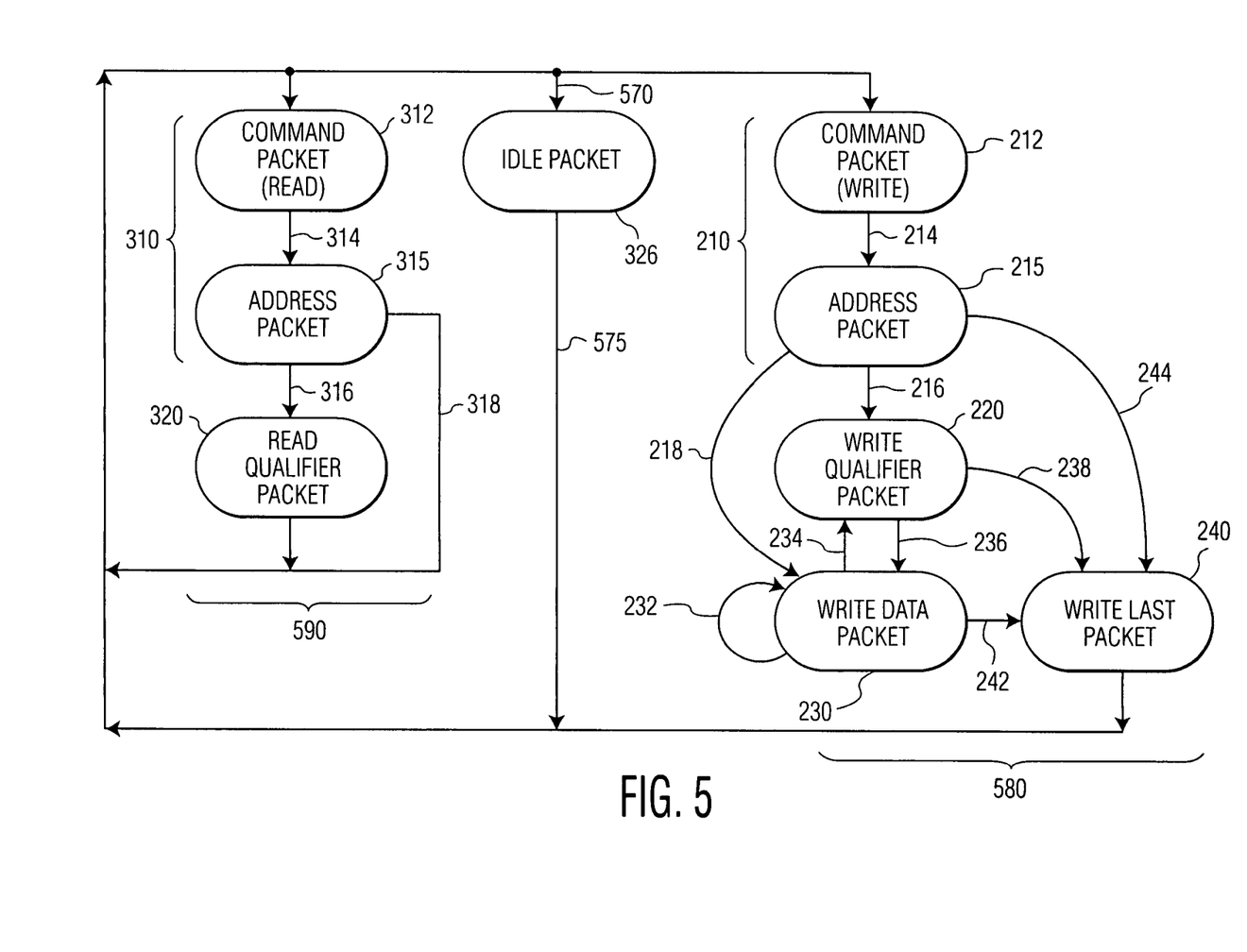
FIG. 5 is a state diagram illustrating a tunnel-out transmit/tunnel-in receive protocol, according to an example embodiment of the present invention.

FIG. 5 is a state diagram illustrating example state transitions of a tunnel protocol for a tunnel-out transmit/tunnel-in receive transaction, also according to the present invention. The tunnel-out end, transmit side 152 sends out read commands, write commands, and write data. States in the write portion 580 of the state diagram of FIG. 5 transition according to the description provided above for like-referenced items illustrated in FIG. 2. States in the read portion 590 of the state diagram of FIG. 5 transition according to the description provided above for like-referenced items illustrated in FIG. 3.

According to one aspect of the tunnel protocol of the present invention, when no commands or write data are pending, cycles of idle packets are transmitted across the tunnel as indicated by the looping transitional path formed including state arrows 570 to, and 575 from transmission of idle packets 326. Idle packets 326 may be inserted at any place in the state diagram of FIG. 5 as require for flow control (e.g., when the tunnel-in end, receive side 144 is full, or nearly so). However, every configuration of an idle packet transmission state is not shown in the diagram of FIG. 5 for simplification.

Coordination of read and write transmissions across the tunnel, according to the combined tunnel-out transmit/tunnel-in receive tunnel protocol, is accomplished through an established priority listed as follows from highest priority to lowest:

(1) Transmit idle packet(s) when the tunnel-in end, receive side is busy;

(2) Transmit any pending command with priority determined external to the tunnel at an arbiter (not shown), and if the command is a write command, also transmit the write data;

(3) Transmit idle packets when there is nothing else to do.

The tunnel-in end, receive side is indicated as being busy by a "T_ACW_BUSY" (Tunnel Address/Command/Write-data busy) signal being asserted to a "1."

All packets of a read command (e.g., the read command packet, the address packet for a 32-bit tunnel, and the optional read qualifier packet) are sent in the order shown in FIG. 5. Only idle packets may be inserted between each of the read command packet(s). Similarly, all packets of a write transaction (e.g., the write command packet, the address packet for a 32-bit tunnel, the optional write qualifier packet, write data packet(s), and the write last packet) are sent in the order shown in FIG. 5. Only idle packets may be inserted between each of the write transaction packets for flow control.

To prevent the complexities that arise when a source synchronous communication system overruns a target (i.e., destination), the tunnel is adapted to only send data when sufficient space is available in a receiving buffer, for example, a first-in, first-out storage structure, or FIFO. Greatest speed and efficiency is achieved by utilizing, in addition to the data storage capacity of the receiving buffer, the temporary data storage capacity of communication channel itself during the "flight time" of the data transmission through the communication channel. The time necessary to send a "full" signal from the receiving buffer to the transmitting end to effect a data transmission stoppage must also be anticipated and incorporated into the timing of transmit/receive coordination signals. Flight time delays are system dependent based on the physical length of the communication channel. For example, using a tunnel interconnect between two system chips on a common board should have a substantially shorter flight time delay than a system interconnected through plug-in cards.

According to one example implementation of the present invention, the length of a communication channel results in a propagation delay of one nanosecond per 6 inches of communication channel. The communication channel has a maximum length of 12 inches, and therefore 2 nanoseconds (nS) of propagation delay is expected from the time a receiving buffer flag is asserted at the destination end of the communication channel until the signal reaches the transmitting end of the communication channel. Similarly, the time elapsed for transmission of data to the destination end of the communication channel is also 2 nS, attributable to data "flight" time, the time it takes data signals to traverse the communication channel. The communication channel propagation delay effectively provides 2 nS of data "storage" in the communication channel itself. Therefore the total delay, between a receiving buffer sending an "almost full" signal until data within the communication channel ceases, is 4 nS.

The highest transmission rate of the present example implementation is 400 MHz, equivalent to 2.5 nS per clock cycle. The 4 nS total delay is compensated for with a 2 clock cycle delay. For clock frequencies of 200 MHz or less, a single clock cycle delay is needed for compensation of the down and back propagation delays through the communication channel. In addition to the communication channel propagation delays, compensation of 3 additional clock cycles is necessary in synchronous clock systems. One additional clock cycle of compensation is needed to transmit a receive buffer status flag where the status flag is generated synchronous to the internal clock. The received status flag signal is also delayed by one clock cycle. The internal status flags in a receiving device must change clock domains, adding another one or two clock cycle(s) of delay depending on metastability hardening configurations. The receiving device is the device receiving the "almost full" flag, generally the device attempting to transmit, for example either tunnel-in transmit end 152 or tunnel-out transmit end 142 in FIG. 1. Therefore, the total clock delay is 5 clock cycles, with 1+1+1=3 clock cycles attributable to clock logic, and 2 additional clock cycles attributable to communication channel propagation delay.

According to one aspect of the present example implementation, a receiving buffer includes programmable "full" levels at which an "almost full" indication is provided (e.g., a status flag is asserted). The range within which the "almost full" indication is programmable is between 4 and 16 ranks left in each individual receiving buffer, inclusive.

Figure 6A:
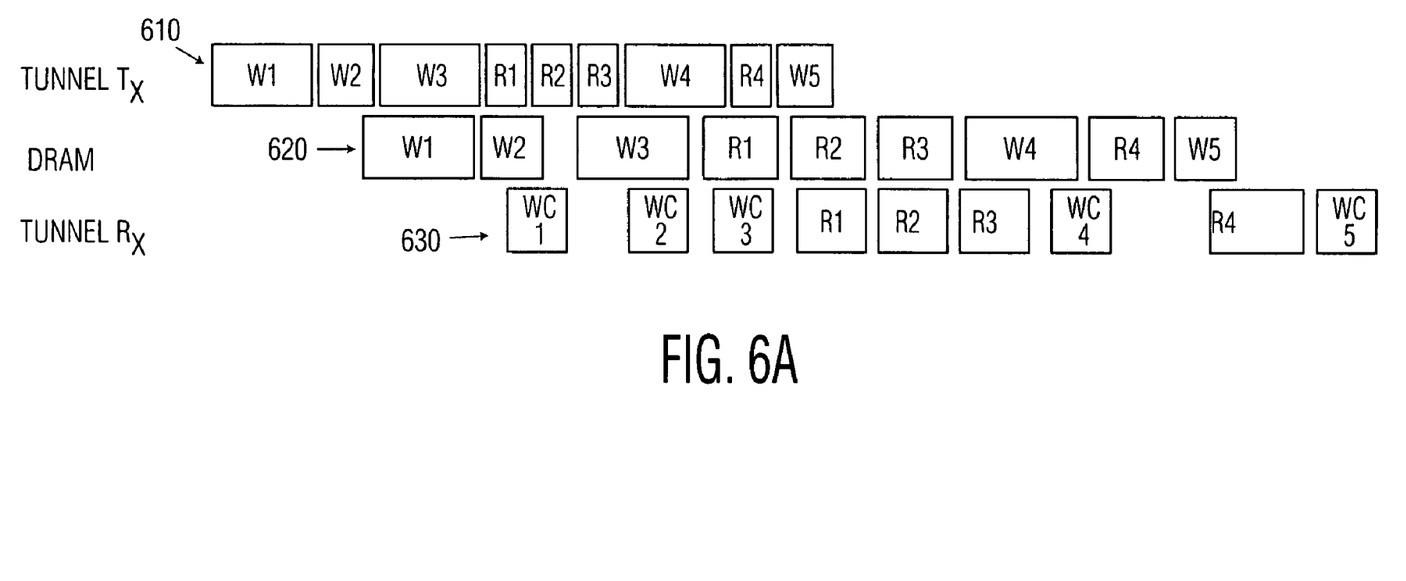
FIG. 6A is a timing diagram illustrating data packet flow control, according to an example embodiment of the present invention.

FIG. 6A is an example timing diagram illustrating data packet flow control from a tunnel 110 to a DRAM 125, according to an example embodiment of the present invention. In the example communication transaction illustrated in FIG. 6A, peripheral 130 is using tunnel 110 to access SDRAM 125. The communication transaction includes a sequence of 3 writes (W1–W3), 3 reads (R1–R3), a forth write (W4), a forth read (R4), and finally a fifth write (W5). The sequence of writes and reads transmitted into the tunnel is shown in the top row 610 of FIG. 6A. As indicated by the orientation of writes and reads in the middle row 620 of FIG. 6A, the DRAM performs all requests in the same order that they are sent/requested at the tunnel transmit end. A write completion code is returned to the receive side of the initiator tunnel after each write is performed at the DRAM, to indicate that the writing task has been completed. The relative timing of these write completion codes, as well as the reads, at the initiator tunnel receive end is illustrated in the bottom row 630 of FIG. 6A. Transmit and receive do not stop; therefore, all the spaces not defined in FIG. 6A are filled with transmission of idle packets (not shown for clarity).

Figure 6B:
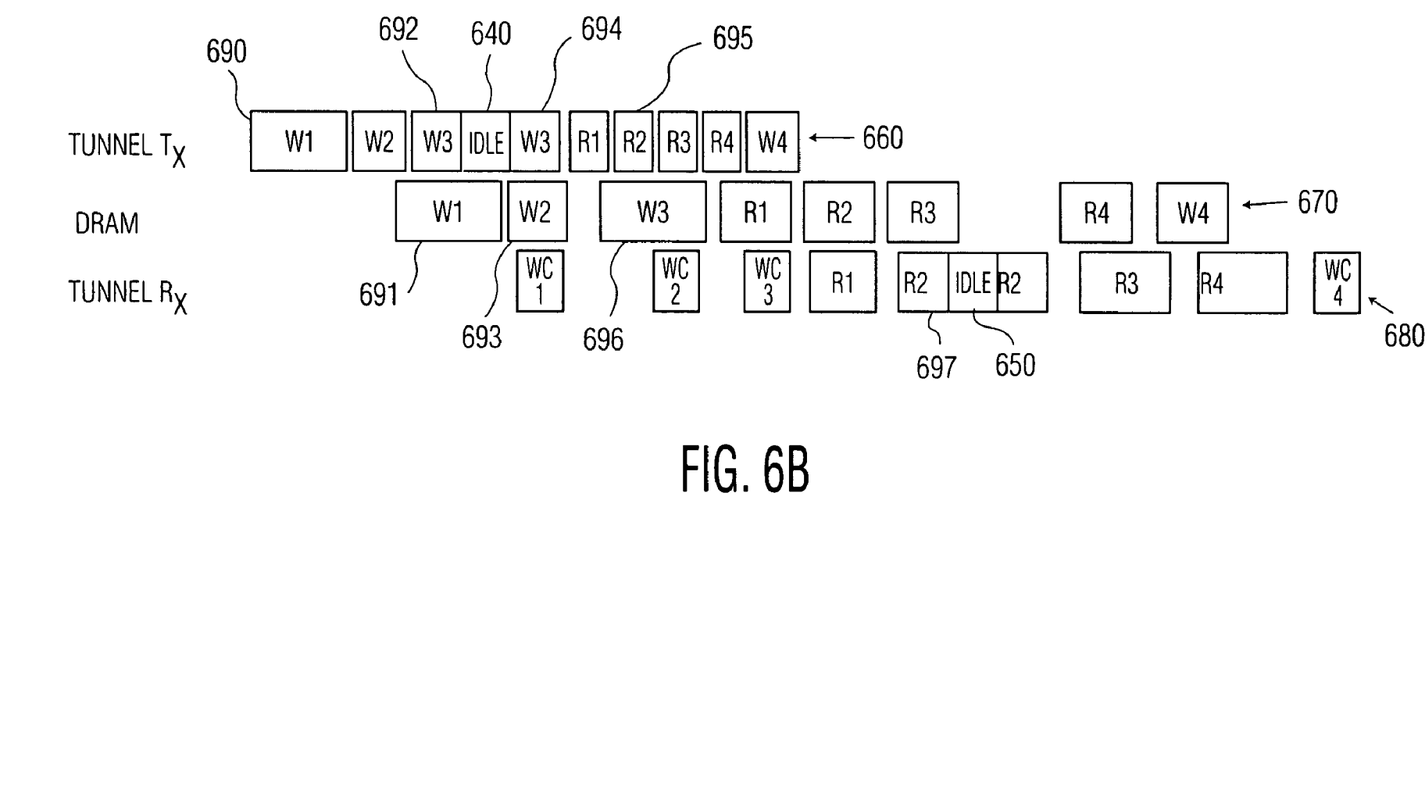
FIG. 6B is a timing diagram illustrating data packet flow control including idle characters, according to an example embodiment of the present invention.

FIG. 6B is an example timing diagram illustrating data packet flow control from a tunnel to a DRAM with insertion of idle packets to accommodate busy receive buffers, according to an example embodiment of the present invention. The nomenclature and sequence of data packets in FIG. 6B is identical to those of FIG. 6A. As previously discussed, transmit and receive do not stop; therefore, all the inter-packet spaces not defined in FIG. 6B are filled with the transmission of idle packets. Only two idle packets, 640 and 650, are explicitly shown in FIG. 6B for clarity. At the relative time indicated at 690, the peripheral sends two writes, W1 and W2, sequentially into the tunnel-out transmit side. At the relative time indicated at 691, the DRAM writes W1. The DRAM cannot begin writing W1 until the W1 has been completely received by the tunnel-in, receive side. At the relative time indicated at 692, the Address/Command/Write-data ("ACW") receive buffer becomes full, resulting in transmission of idle packet 640 and delaying completion of W3. At the relative time indicated at 693, the DRAM completes W1 and starts W2. At the relative time indicated at 694, The transmission of W3 into the tunnel is complete. At the relative time indicated at 695, the peripheral sends four read commands into the tunnel. Being read commands only, each use very little buffer space. At the relative time indicated at 696, the DRAM controller finishes W3 and performs reads R1, R2, and R3. At the relative time indicated at 697, R2 is stalled in-progress across the tunnel waiting for receiving buffer space in the peripheral tunnel-out, receive side. DRAM data must always transfer at DRAM rates, and the DRAM controller can never be waited.

An initiating device cannot abort or suspend a transaction across the tunnel. For example, peripheral 130, or other device coupled through datapath 170 to target 156 of the tunnel-out end, cannot abort or suspend a memory transaction across the tunnel.

While the present invention has been described with reference to several particular example embodiments, various aspects of the present invention address the above-mentioned deficiencies and also provides for communication methods and arrangements that are useful for other applications. The present invention should not be considered limited to the particular examples described above. Various modifications, equivalent processes, as well as numerous structures to which the present invention may be applicable fall within the scope of the present invention. For example, the skilled artisan will appreciate that other communication arrangements are also acceptable, and that multi-chip or single-chip arrangements can be implemented using a similarly constructed one-way or two-way interface for communication between the chip-set arrangements utilizing a transmission protocol as described herein. Further, the skilled artisan will appreciate various additional advantages realized when combining implementations of the present invention with one or more of the embodiments described in the above-referenced patent documents. Such advantages, combinations, other modifications and/or additions may be made without departing from the spirit and scope of the present invention, and may be considered as part of the claimed invention which is set forth in the appended claims.

What is claimed is:

1. A method of parallel data communication across a communication channel between an origination end and a destination end, comprising:
   regularly transferring information from the origination end to the destination end, including transmitting idle data from the origination end to the destination end in response to the destination end being busy and during periods when no commands or data or statuses are pending;
   in response to the destination end not being busy, from the origination end to the destination end
      sequentially transferring read or write commands and, according to a write protocol, pending write data, and
      transmitting idle packets during periods when no commands are pending; and
   in response to the origination end not being busy, from the destination end to the origination end
      sequentially transferring pending end-of-write statuses, and
      sequentially transferring pending read data and read statuses packets according to a read protocol during periods when no end-of-write statuses are pending.

2. The method of claim 1, wherein the write protocol further includes:
   transferring from the originating end a write command, sequentially followed by write data and an end-of-write notice.

3. The method of claim 2, further including transferring from the destination end an end-of-write status responsive to an end-of-write notice.

4. The method of claim 2, further including transferring from the originating end a write address immediately following each write command.

5. The method of claim 2, further including transferring from the originating end byte enable information preceding a portion of the write data.

6. The method of claim 1, wherein read statuses included end-of-the-read and error information.

7. A method of claim 1, wherein information is packetized for transfer.

8. The method of claim 1, further including regularly transferring information from the destination end to the origination end, including transmitting idle data from the destination end to the origination end in response to the origination end being busy and during periods when no read data or read statuses are pending.

9. The method of claim 1, wherein information is transferred from the origination end to the destination end across a first uni-directional datapath of the communication channel, and information is transferred from the destination end to the origination end across a second uni-directional datapath of the communication channel.

10. A data communication arrangement for parallel data communication across a communication channel from an origination end to a destination end, comprising:
    means for regularly transferring information from the origination end to the destination end, including means, responsive to the destination end being busy, for transmitting idle data from the origination end to the destination end and when no commands, or data or statuses are pending;
    means, responsive to the destination end not being busy, and from the origination end to the destination end,
       for sequentially transferring read or write commands and, according to a write protocol, pending write data, and
       for transmitting idle packets during periods when no commands are pending; and
    means, responsive to the origination end not being busy, and from the destination end to the origination end,
       for sequentially transferring pending end-of-write statuses, and
       for sequentially transferring pending read data and read statuses packets according to a read protocol during periods when no end-of-write statuses are pending.

11. The arrangement of claim 10, further including means for transferring from the originating end a write command, sequentially followed by write data and an end-of-write notice.

12. The arrangement of claim 10, further including means for transferring from the destination end an end-of-write status responsive to an end-of-write notice.

13. The arrangement of claim 10, further including measn for regularly transferring information from the destination end to the origination end, including transmitting idle data from the destination end to the origination end in response to the origination end being busy and during periods when no read data or read statuses are pending.

14. The arrangement of claim 10, further including:
    means for simultaneous continuous unidirectional information transfer from the origination end to the destination end, and continuous uni-directional information transfer from the destination end to the origination end.

15. A data communication arrangement for parallel data communication across a communication channel from an origination end to a destination end, comprising:
 a first data processor arrangement located at the origination end and adapted to regularly transfer information to the destination end and, in response to the destination end being busy, to transmit idle data to the destination end when no commands, or data or statuses are pending;
 the first data processor arrangement being further adapted to, in response to the destination end not being busy, sequentially transfer to the destination end read or write commands and, according to a write protocol, pending write data, and transmit idle packets during periods when no commands are pending; and
 a first data processor arrangement located at the destination end and adapted to, in response to the origination end not being busy
 sequentially transfer to the origination end pending end-of-write statuses, and
 sequentially transfer to the origination end pending read data and read statuses packets according to a read protocol during periods when no end-of-write statuses are pending.

* * * * *